United States Patent Office 2,840,186
Patented June 24, 1958

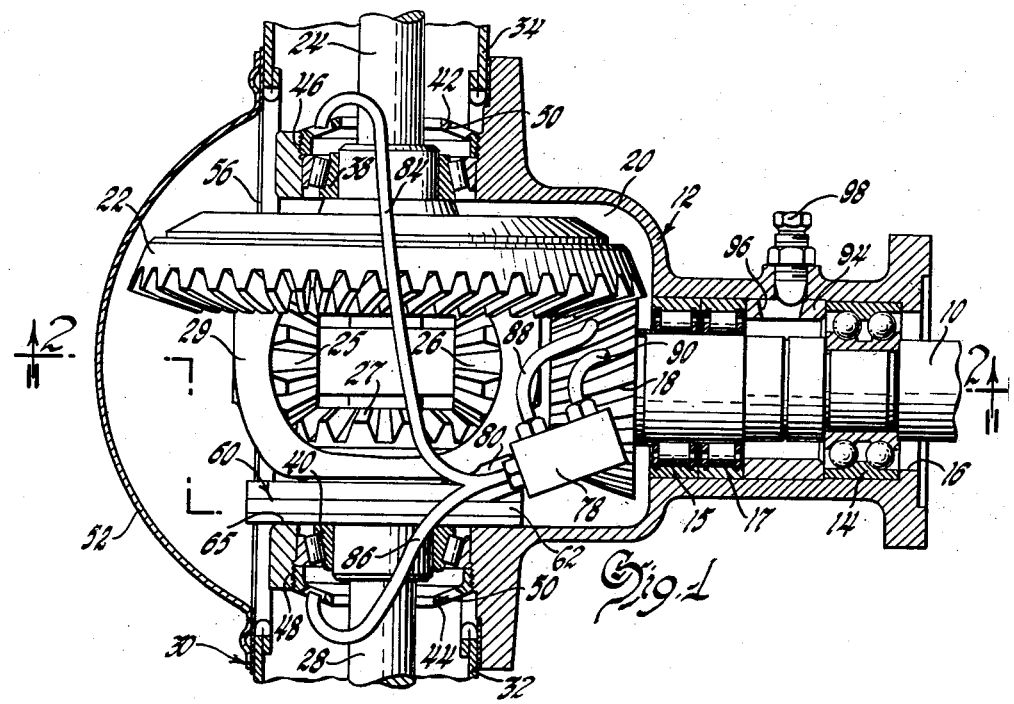
June 24, 1958  J. A. NYLAND  2,840,186
LUBRICATION SYSTEM
Filed July 2, 1954
Inventor
J. Arthur Nyland
L. D. Burch
Attorney

2,840,186

LUBRICATION SYSTEM

J. Arthur Nyland, Swartz Creek, Mich., assignor to General Motors Corporation, Detroit, Mich., a corporation of Delaware Application July 2, 1954, Serial No. 441,017

1 Claim. (Cl. 184—6)

This invention relates to lubrication systems generally and more particularly to forced lubrication systems for use with high speed gears such as those within differential units of motor vehicles and the like.

The lubrication of differential gears and bearing members in motor vehicles is usually provided for by having the differential ring gear rotated within the rear axle lubricant disposed within the bottom of the differential housing. Under normal conditions the splash feed distribution of oil is adequate to supply sufficient lubricant to the mating ring and pinion gears and the various differential bearings. At higher vehicle speeds the velocity of the ring gear is such as to form a channel through the lubricant collected in the bottom of the differential housing without picking up any lubricant and thus causing the gears and bearings to run dry. In the past the periods of high speed operation of differential gears has not been extensive enough to warrant serious concern. However improved highway conditions allowing higher vehicle speeds for longer distances has now caused the problem to be much more serious.

It is now proposed to provide a lubrication system for use with high speed differential gearing which is readily adaptable to conventional differential units and provides a forced lubrication system in addition to the conventional splash feed lubricating system. The proposed forced feed system is operable at all vehicle speeds to supplement the splash feed system as well as to provide lubricant to gears and bearing which would otherwise run dry at higher velocities. The proposed forced feed lubricating system is also operable when the oil level in the differential housing would otherwise be too low to allow splash feed at lower gear velocities. A rotary fluid type pump is mounted within the differential housing near the end of the rear axle housing and is adapted to be driven by the rear axle drive means. Oil is drawn into the pump through a suction line immersed within the differential oil sump and is conveyed to a distributor fitting. From the distributor fitting oil is supplied to various delivery lines arranged in an unobstructive manner over the ring and pinion gears to provide oil to the differential and pinion bearings and within the vicinity of the meshing gears.

The proposed forced lubricating system as adapted to the differential unit of a motor vehicle is inexpensive to manufacture, is readily installed, and includes a minimum of separable elements. The use of the proposed lubrication system obviates concern for dry run wear at high vehicle speeds insuring longer gear life and more efficient unit operation.

In the drawing:

Figure 1 is a cross sectional top view of the differential and rear axle housings of a motor vehicle showing the proposed forced lubricating system as installed. Figure 1 is taken substantially in the plane of line 1—1 of Figure 2 as viewed in the direction of the arrows thereon.

Figure 2 is a cross sectional side view taken substantially in the plane of line 2—2 of Figure 1 as viewed in the direction of the arrows thereon to show the proposed lubricating system.

The proposed forced feed lubricating system is shown incorporated within the differential of a motor driven vehicle. The propeller shaft 10 extends within the differential housing 12 and is journalled within a ball bearing thrust member 14 and roller bearings 15 and 17 mounted within the shaft receiving opening 16. A pinion gear 18 is secured to the end of the propeller shaft 10 within the chamber 20 of the differential housing. The pinion gear 18 meshes with a differential ring gear 22 rotatably mounted about axle shaft 24. Beveled side pinion gears 25 and 26 rotatably mounted on spider 29 secured to the ring gear are adapted to drive the side gears 27, one of which is shown, secured to the axle shafts 24 and 28. The driven axles are disposed within axle housing 30 within ends 32 and 34. The differential housing 12 is secured to the axle housing 30 in a conventional manner not here shown. The inner ends of axles 24 and 28 are journalled within the ends of the carrier or spider 29 which are in turn journalled within bearings 38 and 40 respectively mounted within the differential housing 12 near the ends of the axle housings 30 and 32. Bearing covers 42 and 44 are disposed about axle shafts 24 and 28 over bearings 38 and 40 and are threaded within the differential housing as at 46 and 48 to properly retain and position such bearings. Openings 50 are provided through the cover members 42 and 44 to allow lubrication of the axle shafts and bearing members through the covers. A bowed cover member 52 is secured to the axle housing 30 over the end of the differential housing 12 to protect the bearings and gears within chamber 20 from extraneous foreign matter. The axle housing 30 is formed to provide a cover portion 54 over the differential housing 12 and a similar cover portion 56 underneath the housing 12. The lower cover portion 56 is adapted to act as a differential oil sump 58 for the collection of the differential lubricant.

A rotary type fluid pump 60 is disposed within the differential housing 12 at one end of axle shaft 28. The pump housing 62 is secured by bolt means 64 to the wall 65 of the differential housing member 12 supporting the bearing 40. An impeller member 66 is keyed to the end of the carrier 29, shown in cross section in Figure 2, as at 68 and is adapted to be rotated within the impeller chamber 70 formed within the pump housing 62. An inlet chamber 72 is formed within the housing 62 at the lower side thereof in direct communication with impeller chamber 70. A suction or inlet conduit 74 which has one end immersed in the lubricant collected within the sump 58 is connected through housing 62 and opens within chamber 72. An outlet chamber 76 is formed within the pump housing 62 opposite the inlet chamber 72 and is also in open communication with the impeller chamber 70.

A connector block or distributor fitting 78 is secured to the pump housing 62 upon a passage member 80 opening within outlet chamber 76 as at 82. Tubing of varying lengths are connected to the fitting 78 and are preferably of brass, copper or of other moderately flexible and easily formable material. Such tubing includes bearing lubricating lines 84 and 86 whose open ends are disposed through bearing covers 42 and 44 respectively, line 88 whose open end is disposed in close proximity to the junction of the mating pinion gear 18 and ring gear 22, and line 90 opening within passage 92 formed through the differential housing for access to the thrust bearing 14 and pinion bearings 15 and 17.

The passage 92 formed through the differential housing 12 and within which the end of lubricating line 90 is disposed communicates with the spacer sleeve 94 disposed about the propeller shaft 10. The sleeve 94 is provided with a cam surfaced aperture 96 by means of which the sleeve may be secured in place and also axially adjusted through cooperation with lock screw 98. Opening 100 is also formed through sleeve 94 to provide access from passage 92 directly to the propeller shaft 10 and consequently greater ease in lubricating the thrust bearing 14 and pinion bearings 15 and 17.

The propeller shaft 10 drives the axle shafts 24 and 28 through the pinion gear 18, ring gear 22, side pinions 25 and 26, and side gears 27. Rotation of the side gear carrier or spider 29 causes rotation of impeller 66 within the chamber 70 of pump housing 62. Lubricating fluid is drawn through suction conduit 74 from the sump 58 into the inlet chamber 72 of the pump, is conveyed to the outlet chamber 76, through passage member 80, to the connector block 78 and from there through lubricating lines 84, 86, 88 and 90. Axle shaft bearings 38 and 40 are serviced by lines 84 and 86, propeller shaft bearings 14, 15 and 17 by line 90 and the faces of both the pinion gear 18 and ring gear 22 by line 88.

With the sump 58 filled with lubricating oil to an extent covering the lower edge of the ring gear 22 the gear will pick up and distribute some lubricant by centrifugal splash-off to the gears and bearing members at low vehicle speeds. The lift characteristics of the fluid pump 60 will determine whether or not the pump will assist in low speed lubrication or not. At high vehicle speeds when the velocity of the ring gear 22 through the lubricant in the sump 58 is such as to form a channeled path therethrough without picking up any oil the pump section is then such as to draw lubricating oil into the system and direct such oil to needed locations.

I claim:

A differential drive unit which includes a gear case having a lubricant reservoir provided therein, a differential gear carrier rotatably mounted within said case, a pump housing concentrically disposed about one end of said carrier and fixedly secured to said gear case, a pump impeller enclosed within said housing and operatively connected to said carrier extended therethrough, a conduit having one end disposed within said reservoir and the other end connected to the input side of said pump housing, a lubricant distributor member disposed apart from said housing and connected to the output side thereof, and a plurality of conduits connected to the output side of said distributor member and having the ends thereof disposed adjacent bearings and gear members of said differential drive unit requiring lubrication.

References Cited in the file of this patent

UNITED STATES PATENTS

| | | |
|---|---|---|
| 2,229,337 | Neracher | Jan. 21, 1941 |
| 2,263,936 | Taylor | Nov. 25, 1941 |
| 2,609,674 | Groat | Sept. 9, 1952 |

FOREIGN PATENTS

| | | |
|---|---|---|
| 894,213 | France | March 6, 1944 |
| 624,970 | Great Britain | June 20, 1949 |